April 15, 1952     A. MOESSINGER     2,592,818
THREAD BRAKE

Filed June 28, 1945     2 SHEETS—SHEET 1

INVENTOR:
ALBERT MOESSINGER
BY Karl A. Mayr
ATTORNEY.

April 15, 1952     A. MOESSINGER     2,592,818
THREAD BRAKE
Filed June 28, 1945                            2 SHEETS—SHEET 2
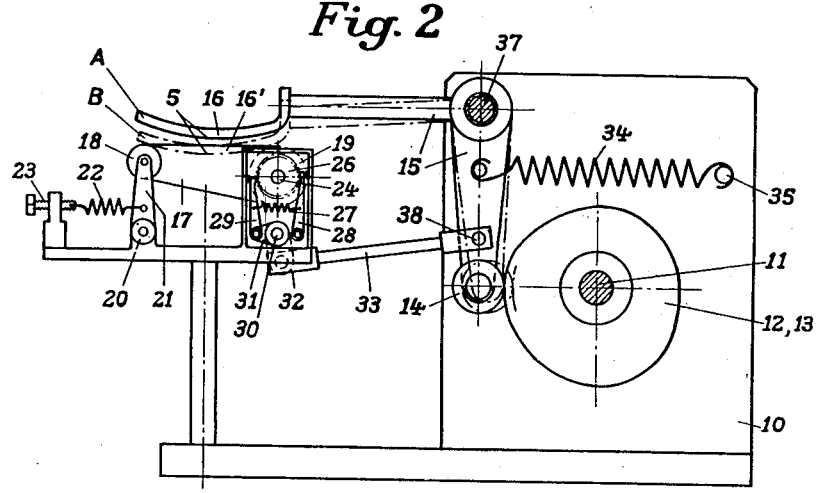
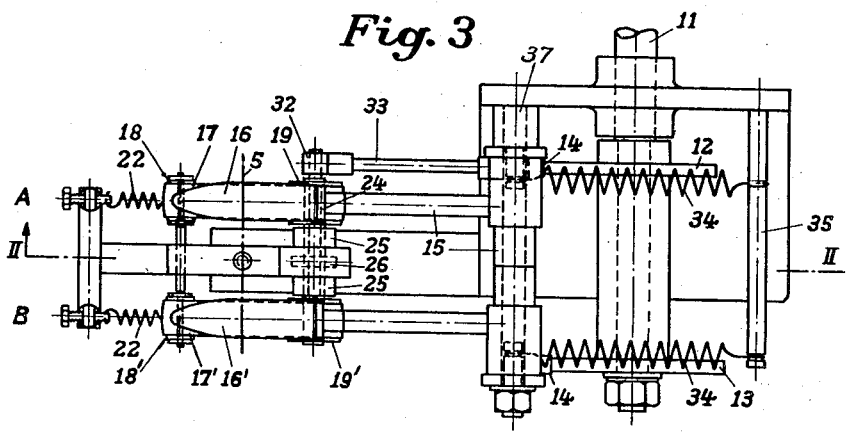
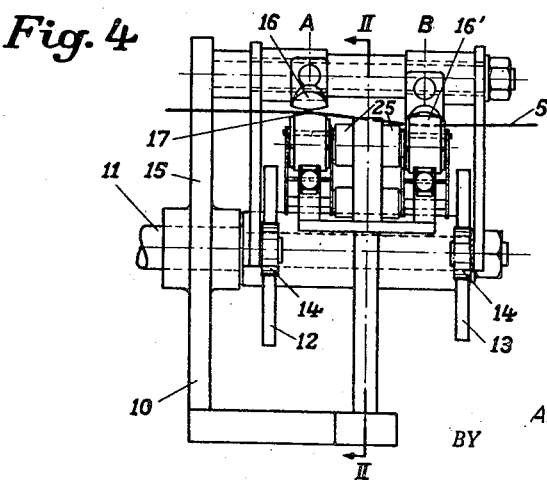
INVENTOR.
ALBERT MOESSINGER
BY
ATTORNEY.

Patented Apr. 15, 1952

2,592,818

UNITED STATES PATENT OFFICE 2,592,818

THREAD BRAKE

Albert Moessinger, Winterthur, Switzerland, assignor to Sulzer Freres, Société Anonyme, Winterthur, Switzerland, Application June 28, 1945, Serial No. 602,074
In Switzerland November 22, 1944

13 Claims. (Cl. 242—147)

1

Known thread brakes consist of two plates of hard material, such as hardened steel, porcelain, glass, etc., between which the thread runs. These thread brakes have various drawbacks. At any irregularity and at any knot, the headed part of the brake must move. In the case of vary rapidly running threads, this raising of the brake plate needs a certain accelerating force which has to be given by the thread itself. The more obtuse the inlet angle to the brake, the greater is the force to be exerted. In threads running at a high speed these forces caused by inequalities and knots in the thread cause such an increase in the thread tension that the thread will generally break.

The invention eliminates these drawbacks by the thread being braked by pressing it against a soft body which is held taut. The soft body may consist of wrapping or filling material. The soft substance, held taut, may make a movement in a direction at such an angle to the direction of running of the thread to be braked that the wear of the soft substance is uniformly distributed. The soft substance may be designed as an endless belt which is held taut between two rollers. The thread may also be pressed with a continuously varying force between the soft substance held taut and a solid body, but it may also be braked between two soft bodies which are held taut.

The brake can be raised from time to time. With advantage, at least two brakes are arranged in series and one brake can be raised whilst the other continues to work. The two brakes may be adjusted to different braking forces and raised rhythmically one after the other. The soft body may be moved forward while the brake is being raised. A characteristic feature of the soft body used in the present invention is that it can take tensile forces only.

Some examples of executions according to the invention are shown in Figs. 1–5.

Figure 1:
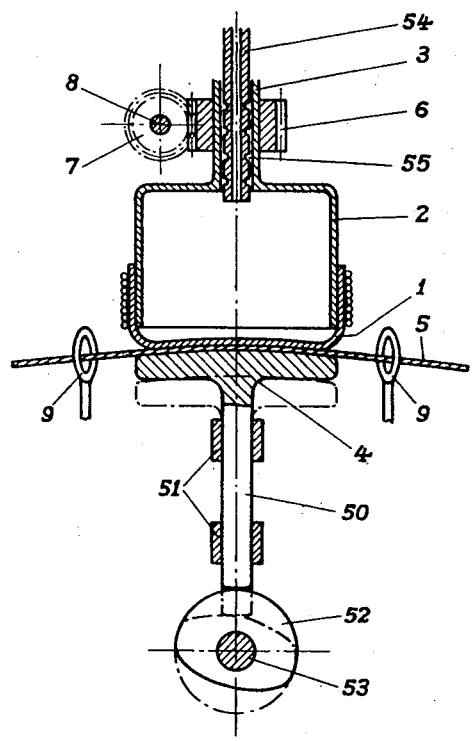

Fig. 1 shows a thread brake in section through the axis of the thread.

Figs. 2–4 explain an example of execution with two brakes arranged in series, Fig. 2 being a section on the line II—II of Fig. 4, and Fig. 3 a plan view of Fig. 2.

Figure 5:
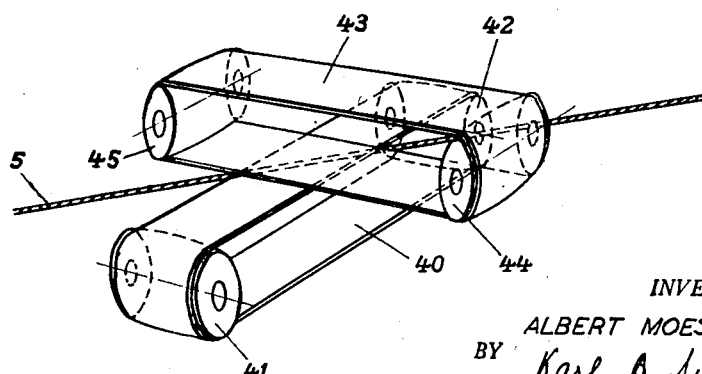

Fig. 5 shows a further example of execution.

In Fig. 1 the tautly held soft body is represented by a membrane 1, which is fixed on an airtight vessel 2. Through the pipe 3 an adjustable air pressure in the vessel 2 will act on the membrane 1, whereby this membrane 1 is pressed against a pressing body 4. The thread runs through between the membrane 1 and pressing body 4 and is thereby braked. In order to prevent any excessive wear at one spot on the soft body 1, for instance resulting in a groove being cut by the running thread 5, the body 2 with the membrane 1 is slowly rotated by the worm-wheel 6 and the worm 7 which is keyed on a rotatable shaft 8. But to ensure that the thread in spite of that always runs in the same direction, it is guided by two eyes 9.

The pressing body 4 is operated from a shaft 50, which is carried in bearings 51 and makes a reciprocating axial movement. The cam 52, which is driven by the shaft 53, acts on the lower part of the shaft 50. The position of the pressing body 4, which corresponds to a relieving of the weft-thread 5, is shown in chain-dotted lines. In order to prevent any air losses, an air pipe 54 is provided, which is suitably led within the rotatable pipe 3 and is provided with, for instance, a labyrinth packing 55.

In Figs. 2–4 an example of execution with two brakes A and B arranged in series is shown. A shaft 11, on which the cams 12 and 13 are keyed, is arranged in bearings in a casing 10. On these two cams individually press the rollers 14, which are connected individually to the bell-crank levers 15, which are carried individually and pivotally on a fixed shaft 37 and individually control the up and down movements of the two pressing bodies 16. These pressing bodies 16 press individually on two individual endless belts 17 and 17' which are arranged individually on two rollers 18 and 19 and 18' and 19'. The rollers 18 and 18' are individually and pivotally carried by levers 21 which are mounted swingably on stationary bearings 20. Levers 21 are held individually and resiliently in positions causing individual tensioning of the belts 17 and 17' by springs 22. One end of said springs is connected individually with a lever 21 and the other end with a stationary part by means of adjusting screws 23.

The rollers 19 and 19' are keyed on a shaft 24, which rotates in stationary bearings 25. On this shaft 24 a ratchet wheel 26 is keyed which is turned by a pawl 29 which is connected with a holding pawl 28 by a spring 27. The pawl 29 is swingably mounted on a crank 31 keyed on the shaft 30.

On the shaft 30 is keyed also a lever 32, which is given a reciprocating motion by means of the connecting rod 33 connected to the pin 38 of the lever 15. In this way a reciprocating motion is imparted to the pawl 29, which transmits a slowly rotating motion to the rollers 19 and 19' through the ratchet wheel 26. Through this slight rotating motion the tautly held endless belts are made to advance. The levers 15 are connected to a stationary part 35 by means of springs 34 and their rollers 14 are pressed thereby resiliently to the cams 12 and 13.

The brake operates as follows:

The weft thread 5 is braked between the pressing bodies 16 and 16' and the endless belts 17 and 17'. Cam 13, through the intermediary action of lever 15, presses body 16' of the brake B (Fig. 4) to belt 17' and brakes the thread 5. After a certain rotation of the machine or of the shaft 11, brake A is pressed similarly and brake B is released. The thread 5 is thus braked alternately by the brakes A and B.

The springs 22 can be chosen in such a way as to give the required tension of the two endless belts, or the required braking force on the weft thread. In gripper looms in which the weft thread is drawn intermittently through the machine, it is of great advantage to vary the braking force on the weft thread 5 from time to time. The braking force of the two brakes A and B can be adjusted individually by adjusting the tension of springs 22 by manipulating the adjusting screws 23.

Fig. 5 shows two endless belts which rub on each other. The endless belt 40 is held taut between the two rollers 41, 42, and the endless belt 43 between the rollers 44, 45. The upper part of the belt 40 presses on the lower part of the belt 43, so that a pressing force exists between these belts. The thread 5 runs through between the two belts and is braked by these two soft bodies. The belts 40 and 43 are given an advance motion, so that the wear caused by the weft thread 5 running between them is distributed over the whole surface of the belts 40 and 43.

By the invention, in addition to the advantage of a uniform braking force on the thread, automatic adjustment of the braking effect on the thread is obtained. The greater the diameter of the thread, the greater is the arc of contact of the belt round the thread. In addition to the greater friction caused by the greater arc of contact, the arc will cause automatically a greater braking effect on the thread. In this way the braking force adjusts itself in accordance with the size of the thread.

I claim:

1. A brake for maintaining a predetermined tension in an axially moving thread, said brake comprising two members between which a length of said thread is pressed, one of said members comprising pliable strip material extending in the direction of movement of said thread substantially by the length of the pressed portion thereof, and provided with a mounting for subjecting it substantially to tensile force only, the other of said members being periodically lifted from said pliable strip member.

2. A brake for an axially moving thread, said brake comprising a pliable and tensioned strip member, a brake member for pressing the thread to said strip member, and an actuating mechanism connected with both members for periodically lifting said brake member from said strip member and for intermittently moving said strip member in a plane substantially parallel to the moving thread.

3. A brake for an axially moving thread, said brake comprising two members between which a length of the thread is pressed, one of said members consisting of pliable and tensioned strip material extending in the direction of movement of the thread substantially by the length of the pressed portion thereof, the other member being adapted to press the thread to said strip material, and an actuating mechanism connected with both members for periodically lifting said other member from said strip material and simultaneously moving said strip material in a plane substantially parallel to the moving thread.

4. A brake for an axially moving thread, comprising, in combination, a mounting having spaced support means, a pliable sheet material having a portion stretched by and extending freely between said support means, said thread moving adjacent to said portion and at an angle to the direction in which said material is stretched between said support means, and a brake member disposed between said support means and movable at an angle to the direction in which said portion is stretched for pressing the thread against the portion of said material between said support means.

5. A brake as defined in claim 4, said material being in the form of a strip disposed in a plane substantially parallel to the thread, and said mounting comprising means for moving said material at an angle with respect to said thread.

6. A brake as defined in claim 4, said material being positioned in a plane substantially parallel to the thread, and said mounting comprising means for moving the material, in its plane, transversely to the direction of movement of said thread.

7. A brake as defined in claim 4, the thread moving substantially transversely to the direction in which the material is stretched.

8. A brake for an axially moving thread, said brake comprising two members between which a length of said thread is pressed, one of said members consisting of tensioned pliable strip material extending in the direction of movement of said thread substantially by the length of the pressed portion thereof, the other member being relatively rigid, and periodically acting actuation means connected with said other member for periodically pressing the thread to said tensioned material.

9. A brake system for an axially moving thread, said system comprising two individually actuated brakes disposed in series with respect to said thread, each brake comprising two members between which a length of thread is pressed, one of said members of each brake comprising a belt movable in a plane substantially parallel to said thread, and individual belt tightening means connected with the belt of each brake and being adjustable for independently adjusting the tension of the belt of each brake.

10. A brake for an axially moving thread, said brake comprising a substantially longitudinally tensioned flat pliable strip means extending in a plane substantially parallel to the thread and the latter extending at an angle to the direction in which said strip means is tensioned, and a brake member movable relatively to said strip means for pressing the thread against said tensioned strip means.

11. A brake system for an axially moving thread, said system comprising two individual brakes arranged in series with respect to said thread, each of said brakes comprising tensioned flexible flat strip means extending in a plane substantially parallel to the thread and the latter extending substantially transversely to the direction in which said strip means are tensioned, and brake means individually movable to and from said strip means for individually pressing the thread against said strip means.

12. A brake for an axially moving thread, comprising, in combination, a mounting having spaced support means, a pliable sheet material stretched and extending freely between said support means, said thread moving adjacent to the portion of said material extending freely between said support means, a brake member for pressing the thread to the freely extending portion of said material, said mounting comprising means for moving said sheet material substantially parallel to the thread, and means connected with said brake member for moving it substantially at a right angle to said thread.

13. A brake system for an axially moving thread, said system comprising two individual individually actuated brakes disposed in series on said thread, each brake comprising two individual co-acting members between which a length of said thread is pressed, two individual actuating means connected individually with one of said members of each brake for individual actuation of said brakes, and a drive means connected with both said actuating means.

ALBERT MOESSINGER.

REFERENCES CITED

The following references are of record in the file of this patent:

UNITED STATES PATENTS

| Number | Name | Date |
|---|---|---|
| 744,442 | Vahle | Nov. 17, 1903 |
| 766,511 | McGuiness | Aug. 2, 1904 |
| 837,110 | Owen | Nov. 27, 1906 |
| 1,240,045 | Hammond-Knowlton | Sept. 11, 1917 |
| 1,319,520 | Felton | Oct. 21, 1919 |
| 1,388,537 | Weithaase | Aug. 23, 1921 |
| 1,876,781 | Snyder | Sept. 13, 1932 |
| 2,006,651 | Perichard | July 2, 1935 |
| 2,089,620 | Rossmann | Aug. 10, 1937 |
| 2,147,602 | Perry | Feb. 14, 1939 |
| 2,179,094 | Joss | Nov. 7, 1939 |
| 2,398,822 | Faris et al. | Apr. 23, 1946 |
| 2,426,631 | Mapes | Sept. 2, 1947 |

FOREIGN PATENTS

| Number | Country | Date |
|---|---|---|
| 28,003 | Great Britain | 1910 |